US012373201B1

(12) United States Patent
Meeske et al.

(10) Patent No.: US 12,373,201 B1
(45) Date of Patent: Jul. 29, 2025

(54) SYSTEM FOR MANAGING A CONSTRUCTION PROJECT LIFECYCLE

(71) Applicant: Rosendin Electric, Inc., San Jose, CA (US)

(72) Inventors: Fred Meeske, Gilbert, AZ (US); Edmundo Cruz, Phoenix, AZ (US); Jose Samaniego, Phoenix, AZ (US); Jad Chalhoub, Phoenix, AZ (US)

(73) Assignee: Rosendin Electric, Inc., San Jose, CA (US)

( * ) Notice: Subject to any disclaimer, the term of this patent is extended or adjusted under 35 U.S.C. 154(b) by 235 days.

(21) Appl. No.: 17/976,181

(22) Filed: Oct. 28, 2022

Related U.S. Application Data

(60) Provisional application No. 63/278,433, filed on Nov. 11, 2021.

(51) Int. Cl.
  *G06F 9/44*  (2018.01)
  *G06F 8/77*  (2018.01)
  *G06F 9/54*  (2006.01)
  *G06Q 10/063*  (2023.01)

(52) U.S. Cl.
  CPC ............... *G06F 8/77* (2013.01); *G06F 9/54* (2013.01); *G06Q 10/063* (2013.01)

(58) Field of Classification Search
  None
  See application file for complete search history.

(56) References Cited

U.S. PATENT DOCUMENTS

| | | | | |
|---|---|---|---|---|
| 8,180,727 | B2* | 5/2012 | McLean | G06Q 10/06 701/1 |
| 11,748,709 | B2* | 9/2023 | Shor | G06Q 10/103 705/7.17 |
| 2006/0190582 | A1* | 8/2006 | Fry | G06Q 10/00 709/223 |
| 2007/0156696 | A1* | 7/2007 | Lim | G06F 9/468 707/999.009 |
| 2008/0059474 | A1* | 3/2008 | Lim | G06Q 10/10 707/E17.106 |
| 2018/0081763 | A1* | 3/2018 | Christie | G06Q 10/06 |
| 2022/0138366 | A1* | 5/2022 | Babur | G06Q 10/06313 703/1 |
| 2022/0414610 | A1* | 12/2022 | Doan | G06Q 10/20 |

* cited by examiner

*Primary Examiner* — Qamrun Nahar
(74) *Attorney, Agent, or Firm* — Rutan and Tucker, LLP

(57) ABSTRACT

A system for managing a construction project lifecycle is disclosed. The system can include a surveyor module having an application programming interface (API) to connect to and access data associated with feeder conduit installations and feeder wire installations in a construction project. The surveyor module can display templates to a user, where the templates can include at least wire forms, an order history associated with the accessed data, a feed conduit data, a feeder wire data, a termination megger data, and a termination torque data. The surveyor module can further update and display the accessed data to the user in real-time. The system can include one or more processing units to execute software instructions associated with the surveyor module, and one or more non-transitory storage mediums to store at least software associated with the surveyor module.

18 Claims, 6 Drawing Sheets

Conduit Installations

- an originating equipment
- a destination equipment
- information of an installer
- a date of an installation
- the installation is complete?
- duration of the installation

Wire Installations

- an originating equipment
- a destination equipment

FIG. 2

SYSTEM FOR MANAGING A CONSTRUCTION PROJECT LIFECYCLE

FIELD

Embodiments of this disclosure generally relate to a system for managing a construction project lifecycle.

BACKGROUND

Previously some commercial applications promising data continuity throughout the project lifecycle require a complete replacement of existing software stacks potentially creating a lapse of functionality or need for retraining.

SUMMARY

According to an aspect of the present disclosure, a system for managing a construction project lifecycle is disclosed. The system for managing a construction project lifecycle can include a surveyor module having an application programming interface (API) configured to connect to and access data associated with feeder conduit installations and feeder wire installations in a construction project. The surveyor module can display templates to a user, where the templates include at least wire forms, an order history associated with the accessed data, a feed conduit data, a feeder wire data, a termination megger data, and a termination torque data. The system for managing the construction project lifecycle can further update and display the accessed data to the user in real-time. The system for managing a construction project lifecycle can include one or more processing units to execute software instructions associated with the surveyor module, and one or more non-transitory storage mediums to store at least software associated with the surveyor module.

In some embodiments, the accessed data associated with the feeder conduit installations includes at least an originating equipment, a destination equipment, information of an installer, a date of an installation, whether the installation is complete, and a duration of the installation. In an embodiment, the accessed data associated with the feeder wire installations includes at least an originating equipment, and a destination equipment.

In several embodiments, the surveyor module can allow the user to review data associated with terminations megger and terminations torque, and call up the templates, where each of the templates include a feeder number, an originating equipment, a destination equipment, a modeled length, a conduit installations date, an amount of conduit installed, a name of an installer, a tax code associated with the installed conduit, a time took for the installation, an installation type, a conduit pipe installed, and any parallel runs. The templates can include macros made out of spreadsheet sheets.

In additional embodiments, the surveyor module can allow the user to create custom macros to facilitate automate activities with a template of the templates in connection with other sources of data. The surveyor module can further use and populate the templates with known information. In some embodiments, the surveyor module can include a software translation layer having algorithms that once the user puts new information into a template and submits the template, the software translation module can collect and store the new information, where a user interface of the template is projected in a form and format that the user in the field uses. The software translation module can include a Structured Query Language (SQL) conversion module to translate programming requests. The programming requests can include queries, relational database tasks, data row requests, and data table reading requests, from one or more non-SQL programming languages into a single format SQL, and the one or more non-SQL programming languages can include commands and associated parameters. The SQL conversion module can extract the new information and put the extracted new information into the template. In an embodiment, the software translation module can store and organize the extracted new information in a SQL database and, upon receiving a request, access the extracted new information and populate the accessed new information into a corresponding template and display the template to the user.

In some embodiments, the surveyor module can capture one or more pictures of one or more floor plans of a construction site at one or more pre-determined intervals and use artificial intelligence models to at least one of 1) automatically link the one or more pictures, 2) compare pictures captured at different dates, 3) create reports including comparison between the one or more pictures with a building information model, and 4) provide remote access to the project construction site.

According to another aspect of the present disclosure, a method for managing a construction project lifecycle is disclosed. The method can include configuring a surveyor module having an application programming interface (API) to connect to and access data associated with feeder conduit installations and feeder wire installations in a construction project, configuring the surveyor module to display templates to a user, where the templates include at least wire forms, an order history associated with the accessed data, a feed conduit data, a feeder wire data, a termination megger data, and a termination torque data, configuring the surveyor module to update and display the accessed data to the user in real-time, configuring one or more processing units to execute software instructions associated with the surveyor module, and configuring one or more non-transitory storage mediums to store at least software associated with the surveyor module.

In an embodiment, the method can include configuring the surveyor module to allow the user to review data associated with terminations megger and terminations torque. The method can further include configuring the surveyor module to call up the templates, where each of the templates include a feeder number, an originating equipment, a destination equipment, a modeled length, a conduit installations date, an amount of conduit installed, a name of an installer, a tax code associated with the installed conduit, a time took for the installation, an installation type, a conduit pipe installed, and any parallel runs.

In some embodiments, the method can include configuring the surveyor module to allow the user to create custom macros to facilitate automate activities with a template of the templates in connection with other sources of data. The method can further include configuring the surveyor module to use and populate the templates with known information, configuring the surveyor module to include a software translation module having algorithms that once the user puts new information into a template and submits the template, and configuring the software translation module to collect and store the new information, where a user interface of the template is projected in a form and format that the user in the field uses.

In several embodiments, the method can include configuring the software translation module to include a Structured Query Language (SQL) conversion module to translate programming requests, where the programming requests include queries, relational database tasks, data row requests, and data table reading requests, from one or more non-SQL programming languages into a single format SQL, where the one or more non-SQL programming languages include commands and associated parameters, configuring the SQL conversion module to extract the new information and put the extracted new information into the template, and configuring the software translation module to store and organize the extracted new information in a SQL database and, upon receiving a request, access the extracted new information and populate the accessed new information into a corresponding template and display the template to the user.

In additional embodiments, the method can include configuring the surveyor module to capture one or more pictures of one or more floor plans of a construction site at one or more pre-determined intervals and use artificial intelligence models to at least one of 1) automatically link the one or more pictures, 2) compare pictures captured at different dates, 3) create reports including comparison between the one or more pictures with a building information model, and 4) provide remote access to the project construction site.

According to yet another aspect of the present disclosure, a non-transitory computer readable medium in a system for managing construction project lifecycle, including one or more computer readable codes operable is disclosed. The non-transitory computer readable medium, when executed by one or more processors, is configured to instruct the surveyor module residing on the system for managing construction project lifecycle to perform the method for construction project lifecycle.

These and other features of the design provided herein can be better understood with reference to the drawings, description, and claims, all of which form the disclosure of this patent application.

BRIEF DESCRIPTION OF THE DRAWINGS

The above, and other, aspects, features, and advantages of several embodiments of the present disclosure will be more apparent from the following description as presented in conjunction with the following several figures of the drawings. The drawings refer to embodiments of the present disclosure in which:

FIG. 2 illustrates a block diagram of various fields included in a conduit installation and a wire installation in a system for managing construction project lifecycle, in accordance with some embodiments of the present disclosure.

Figure 1A:
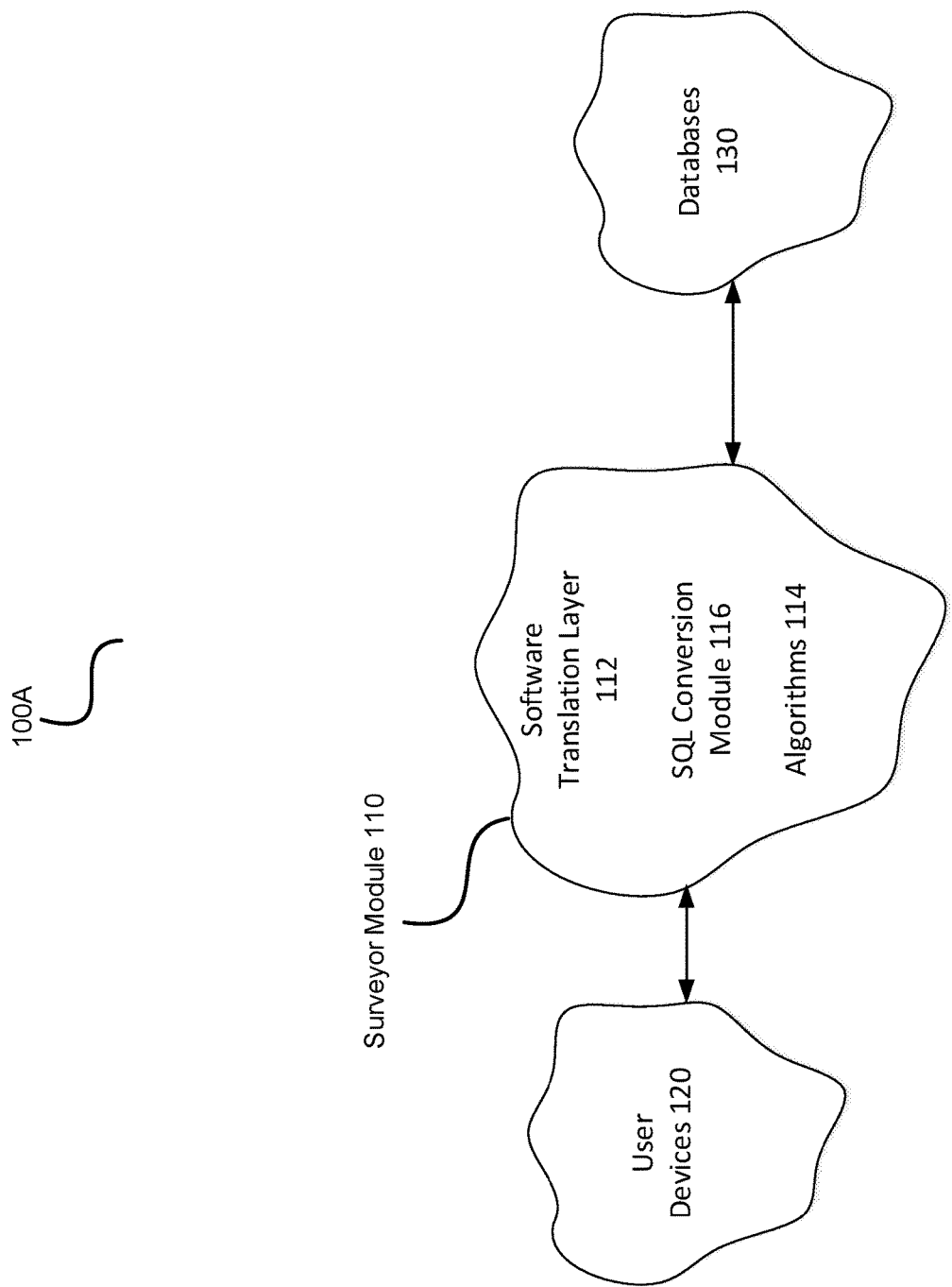
FIGS. 1A-1B illustrate block diagrams of a system for managing construction project lifecycle, in accordance with an embodiment of the disclosure.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific data signals, named components, number of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server computing system, can be made. However, the specific numeric reference should not be interpreted as a literal sequential order but rather interpreted that the first server computing system is different than a second server computing system. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

The system for managing construction project lifecycle has many features and some example features will be discussed below. In general, an embodiment discussing a system for managing construction project lifecycle will be discussed as an example embodiment.

Disclosed system for managing construction project lifecycle can include a surveyor application or a web portal that allows construction project teams to easily track conduit and wire installations, identify any missing feeder and conduit information, and link construction project information to other data sources such as Oracle™ and/or About Time™. Additionally, the surveyor application can prevent data duplication and contradiction as well as support unlimited data extraction and analysis possibilities.

Figure 1B:
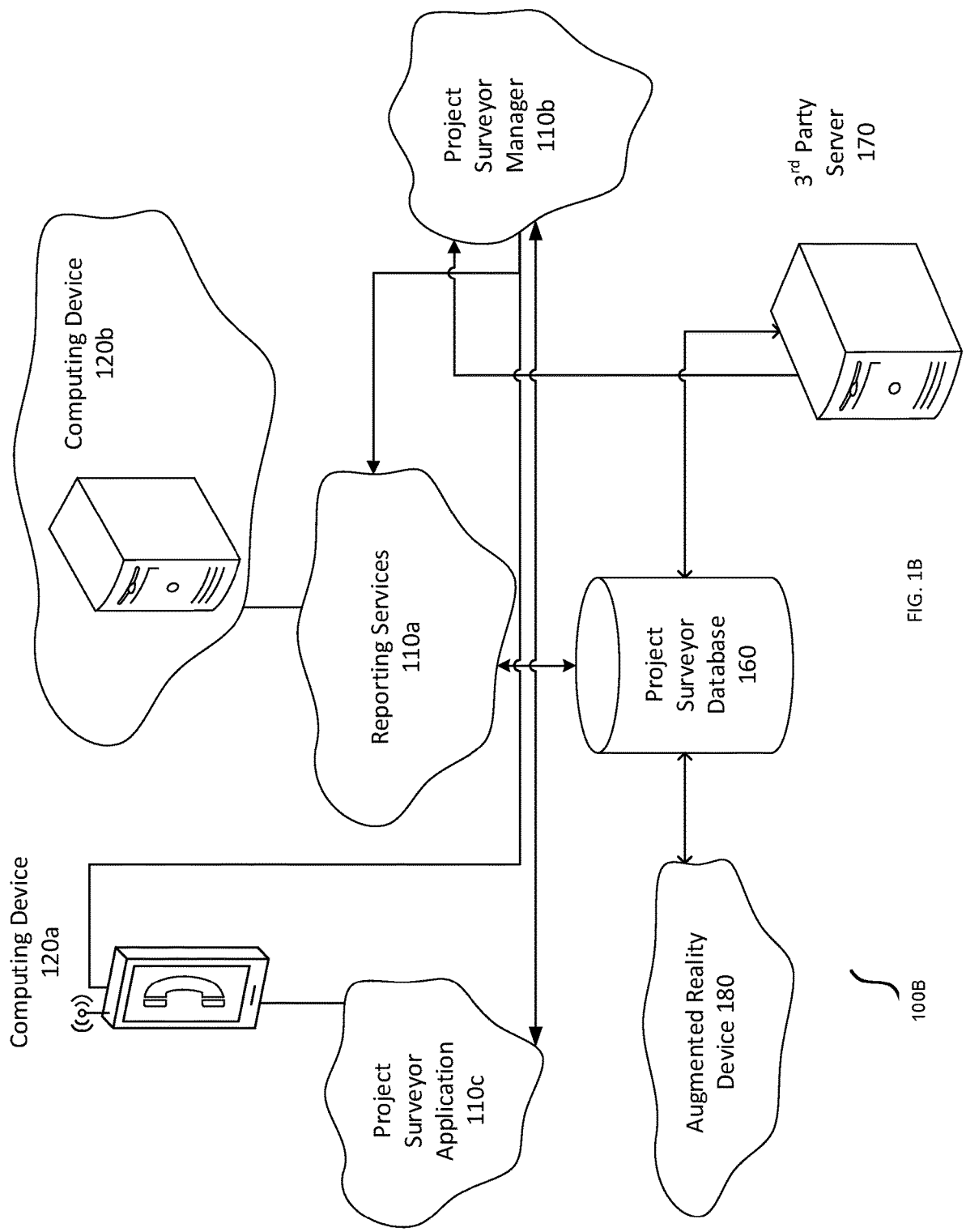

FIGS. 1A-1B illustrate block diagrams of a system for managing construction project lifecycle, in accordance with an embodiment of the disclosure.

Referring to FIG. 1A now, a block diagram of a system for managing construction project lifecycle 100A, in accordance with an embodiment of the disclosure is illustrated. As shown, the system for managing construction project lifecycle 100A can include a surveyor module 110 communicatively coupled to one or more user devices 120, and one or more databases 130. The surveyor module 110 can include a software translation layer 112, one or more algorithms 114, and a Structure Query Language (SQL) conversion module 116.

The surveyor module 110 can include an application programming interface (API) to connect to and access data associated with feeder conduit installations and feeder wire installations in a construction project.

Referring to FIG. 1B, now, a block diagram of a system for managing construction project lifecycle 100B, in accordance with an embodiment of the disclosure. In an embodiment, the surveyor module 110 as shown in FIG. 1A can include multiple components. As a non-limiting example, the surveyor module can include a reporting service 110a (hereinafter "project surveyor reports"), a project surveyor manager 110b and a project surveyor application 110c. In several embodiments, the reporting service 110a, the project surveyor manager 110b and the project surveyor application 110c are in communication with each other. The project surveyor application 110c can be utilized on a desktop or mobile device by the field personnel on site, such as a construction worker. The project surveyor manager 110b can be utilized on a desktop by a field administrator or any other personnel responsible for, and authorized to, updating the feeder schedule and the data associated with feeder conduit installations and feeder wire installations. The project surveyor reports 110a can be utilized by high level personnel such as the project manager to get real-time reports of what is occurring in the construction project. In additional embodiments, the project surveyor reports 110a of the surveyor module can include and/or communicate with a project surveyor database 160 which stores the data associated with the construction projects. Various components of the surveyor module (i.e., the reporting service 110a, the project surveyor manager 110b and the project surveyor application 110c) can communicate and exchange data with computing devices 120a and 120b, augmented reality devices 180 and $3^{rd}$ party servers 170.

FIG. 2 illustrates a block diagram of various fields included in a conduit installation and a wire installation in a system for managing construction project lifecycle, in accordance with some embodiments of the present disclosure. As shown in FIG. 2, the surveyor module 110 can retrieve data associated with feeder conduit installations which can include an originating equipment, a destination equipment, information of the installer (e.g., name, title, hourly rate, etc.), a date of the installation, whether the installation is complete, a duration of the installation, etc. Alternatively, the surveyor module 110 can retrieve data associated with feeder wire installations which can include the originating equipment, and the destination equipment. The surveyor module 110 can include templates which include the data associated with the feeder conduit installations and the feeder wire installations in the construction project. The user (e.g., the installer, a supervisor, CEO of the developing company, etc.) can use the template and modify the templates by entering new data associated with the feeder conduit installations and the feeder wire installations in the construction project.

In various embodiments, the templates include additional data, including but not limited to wire forms, an order history associated with the accessed data, a feed conduit data, a feeder wire data, a termination megger data, and a termination torque data. The system for managing the construction project lifecycle 100 can further update the templates and display the accessed data and the templates to the user in real-time.

In several embodiments, the system for managing a construction project lifecycle 100 can include one or more processing units to execute software instructions associated with the surveyor module, and one or more non-transitory storage mediums to store at least software associated with the surveyor module.

In several embodiments, once accessed the data and/or the templates, the surveyor module 110 can allow the user to review data associated with terminations megger and terminations torque, and call up the templates, where each of the templates include a feeder number, an originating equipment, a destination equipment, a modeled length, a conduit installations date, an amount of conduit installed, a name of an installer, a tax code associated with the installed conduit, a time took for the installation, an installation type, a conduit pipe installed, and any parallel runs. The templates can include macros made out of spreadsheet sheets.

Typically, acceptance tests should be performed on the wire and conduit installations to make sure they are in accordance with applicable codes, standards and manufacturers' instructions. For example, megger tests could be performed at a DC voltage of 1,000 volts for 600 volt rated equipment, and at a DC voltage of 500 volts for 120-300 volt rated equipment. Further, prior to acceptance tests, the user can perform visual tests including to verify that the equipment complies with the contract documents and the shop drawing submittals, that the equipment is completely and properly installed according to the contract documents and the manufacturer's instructions, that the adequate working space exists around the equipment to fully open doors and access panels, and to access all components that require maintenance, that the equipment is free from damage and defects, that the shipping blocks and restraints have been removed, that the equipment has been aligned, that the equipment has been lubricated, that the ventilation louvers are open and unobstructed, that the electrical connections have been tightened, that the voltages, phases, and rotation have been identified that the terminations have been identified, that the equipment labels have been installed, that the equipment has been calibrated, and that the equipment is ready to be electrically tested.

In additional embodiments, the surveyor module 110 can allow the user to create custom macros to facilitate automate activities with a template of the templates in connection with other sources of data. The surveyor module 110 can further use and populate the templates with known information. Template macros can be made out of spreadsheet sheets, which many departments use for daily activities.

The surveyor module 110 can use the templates and populates the fields with currently known information. The surveyor module 110 can also have algorithms that once a user puts new information into a particular template and submits the template, then the algorithms collect the new information. A user interface of the template can be projected in a form and format that other users in the field are typically using in that particular field.

In some embodiments, the surveyor module 110 can include the software translation layer 112 having algorithms 114 that once the user puts new information into a template and submits the template. The software translation layer 112 can collect and store the new information, where a user interface of the template is projected in a form and format that the user in the field uses. The software translation layer 112 can include a Structured Query Language (SQL) conversion module 116 to translate programming requests. The programming requests can include queries, relational database tasks, data row requests, and data table reading requests, from one or more non-SQL programming languages into a single format SQL, and the one or more non-SQL programming languages can include commands and associated parameters. The SQL conversion module 116 can extract the new information and put the extracted new information into the template. In an embodiment, the software translation layer 112 can store and organize the extracted new information in a SQL database and, upon receiving a request, access the extracted new information and populate the accessed new information into a corresponding template and display the template to the user.

In other words, the surveyor module 110 can include various algorithms 114 that go through and then extract the information that the user put into the template and store and organize the information in a SQL database. When the surveyor module 110 needs information in other connected applications, then a routine can request that the surveyor module 110 retrieve the latest information in the SQL database, then the surveyor module 110 can obtain that information and populate it into a template and/or user interface the surveyor module 110 is going to be presenting on the user interface in the other application.

In several embodiments, the templates can act as an input sheet that is provided to the field. While all the information that were put into the fields of the template can come from the field for this particular template, in the beginning, once the information goes into the database, such information is stored in the database permanently, and any user who wants to communicate about a particular equipment can see the information in their application on their device. The system for managing construction project lifecycle can automatically graph and create a history associated with a conduit or wire, show a purchase of equipment and its dates, show installation dates, and any other pertinent data that the other users, e.g., engineers, can use for calculating fault current across the construction project. Further, the system for managing construction project lifecycle can enable the users to derate their electrical conductors, or place a purchase. All the updates and communications can occur and be accessed in real-time.

In some embodiments, the surveyor module can capture one or more pictures of one or more floor plans of a construction site at one or more pre-determined intervals and use artificial intelligence models to at least one of 1) automatically link the one or more pictures, 2) compare pictures captured at different dates, 3) create reports including comparison between the one or more pictures with a building information model, and 4) provide remote access to the project construction site.

The system for managing construction project lifecycle can enable the user to publish SharePoint™ and Excel™ templates online. The SharePoint™ and Excel™ templates online can keep the users and project running on time with BIM project schedules. A feeder schedule and a project drawing schedule can be used to ensure that each project team has what they need when they need it. By utilizing the SharePoint™ and Excel™ templates, teams may no longer need to worry about multiple file locations or losing track of which version is the most current. In some embodiments, for added security, a data record and historical record is also securely kept so that the current project schedule as well as previous project schedules can be reviewed.

Figure 3:
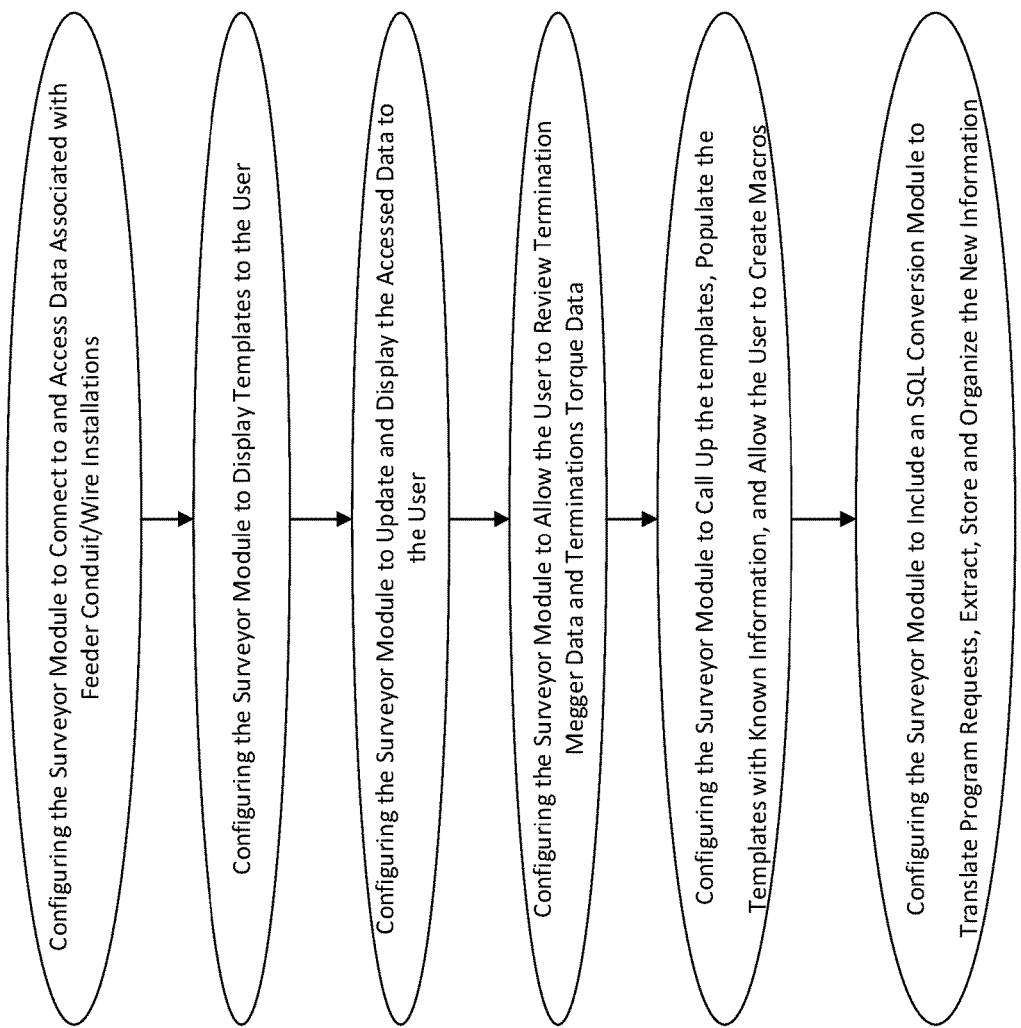
FIG. 3 illustrates a flow diagram of a method for managing construction project lifecycle, in accordance with some embodiments of the present disclosure.

FIG. 3 illustrates a flow diagram of a method for managing construction project lifecycle, in accordance with some embodiments of the present disclosure. According to an aspect of the present disclosure, a method for managing a construction project lifecycle 300 is disclosed. The method 300 can include configuring a surveyor module having an API to connect to and access data associated with feeder conduit installations and feeder wire installations in a construction project, configuring the surveyor module to display templates to a user, configuring the surveyor module to update and display the accessed data to the user in real-time, configuring one or more processing units to execute software instructions associated with the surveyor module, and configuring one or more non-transitory storage mediums to store at least software associated with the surveyor module. The templates can include at least wire forms, an order history associated with the accessed data, a feed conduit data, a feeder wire data, a termination megger data, and a termination torque data.

In an embodiment, the method 300 can include configuring the surveyor module to allow the user to review data associated with terminations megger and terminations torque, and configuring the surveyor module to call up the templates. Each of the templates can include a feeder number, an originating equipment, a destination equipment, a modeled length, a conduit installations date, an amount of conduit installed, a name of an installer, a tax code associated with the installed conduit, a time took for the installation, an installation type, a conduit pipe installed, and any parallel runs.

In some embodiments, the method 300 can include configuring the surveyor module to allow the user to create custom macros to facilitate automate activities with a template of the templates in connection with other sources of data, configuring the surveyor module to use and populate the templates with known information, configuring the surveyor module to include a software translation module having algorithms that once the user puts new information into a template and submits the template, and configuring the software translation module to collect and store the new information. A user interface of the template can be projected in a form and format that the user in the field uses.

In several embodiments, the method 300 can include configuring the software translation module to include a SQL conversion module to translate programming requests. The programming requests can include queries, relational database tasks, data row requests, and data table reading requests, from one or more non-SQL programming languages into a single format SQL, and the one or more non-SQL programming languages can include commands and associated parameters. The method 300 can further include configuring the SQL conversion module to extract the new information and put the extracted new information into the template, and configuring the software translation module to store and organize the extracted new information in a SQL database and, upon receiving a request, access the extracted new information and populate the accessed new information into a corresponding template and display the template to the user.

In additional embodiments, the method 300 can include configuring the surveyor module to capture one or more pictures of one or more floor plans of a construction site at one or more pre-determined intervals and use artificial intelligence models to at least one of 1) automatically link the one or more pictures, 2) compare pictures captured at different dates, 3) create reports including comparison between the one or more pictures with a building information model, and 4) provide remote access to the project construction site.

Various embodiments of the present disclosure illustrated in FIGS. 1-5, disclose a system for managing a construction project lifecycle is disclosed. The system for managing a construction project lifecycle can include a surveyor module having an application programming interface (API) which can connect to and access data associated with feeder conduit installations and feeder wire installations in a construction project. The surveyor module can display templates to a user, which include at least wire forms, an order history associated with the accessed data, a feed conduit data, a feeder wire data, a termination megger data, and a termination torque data. The system for managing the construction project lifecycle can further update and display the accessed data to the user in real-time. The system for managing a construction project lifecycle can include one or more processing units to execute software instructions associated with the surveyor module, and one or more non-transitory storage mediums to store at least software associated with the surveyor module.

The accessed data associated with the feeder conduit installations can include at least an originating equipment, a destination equipment, information of an installer, a date of an installation, whether the installation is complete, and a duration of the installation. In an embodiment, the accessed data associated with the feeder wire installations includes at least an originating equipment, and a destination equipment.

The surveyor module can allow the user to review data associated with terminations megger and terminations torque, and call up the templates. Each of the templates can include a feeder number, an originating equipment, a destination equipment, a modeled length, a conduit installations date, an amount of conduit installed, a name of an installer, a tax code associated with the installed conduit, a time took for the installation, an installation type, a conduit pipe installed, and any parallel runs. The templates can further include macros made out of spreadsheet sheets.

The surveyor module can allow the user to create custom macros to facilitate automate activities with a template of the templates in connection with other sources of data. The surveyor module can further use and populate the templates with known information. In some embodiments, the surveyor module can include a software translation layer having algorithms that once the user puts new information into a template and submits the template, the software translation module can collect and store the new information. A user interface of the template can be projected in a form and format that the user in the field uses. The software translation module can include a Structured Query Language (SQL) conversion module to translate programming requests. The programming requests can include queries, relational database tasks, data row requests, and data table reading requests, from one or more non-SQL programming languages into a single format SQL, and the one or more non-SQL programming languages can include commands and associated parameters. The SQL conversion module can extract the new information and put the extracted new information into the template. In an embodiment, the software translation module can store and organize the extracted new information in a SQL database and, upon receiving a request, access the extracted new information and populate the accessed new information into a corresponding template and display the template to the user.

In some embodiments, the surveyor module can capture one or more pictures of one or more floor plans of a construction site at one or more pre-determined intervals and use artificial intelligence models to at least one of 1) automatically link the one or more pictures, 2) compare pictures captured at different dates, 3) create reports including comparison between the one or more pictures with a building information model, and 4) provide remote access to the project construction site.

According to another aspect of the present disclosure, a non-transitory computer readable medium in a system for managing construction project lifecycle, including one or more computer readable codes operable is disclosed. The non-transitory computer readable medium, when executed by one or more processors, is configured to instruct the surveyor module residing on the system for managing construction project lifecycle to perform the method for construction project lifecycle, as discussed above.

Figure 4:
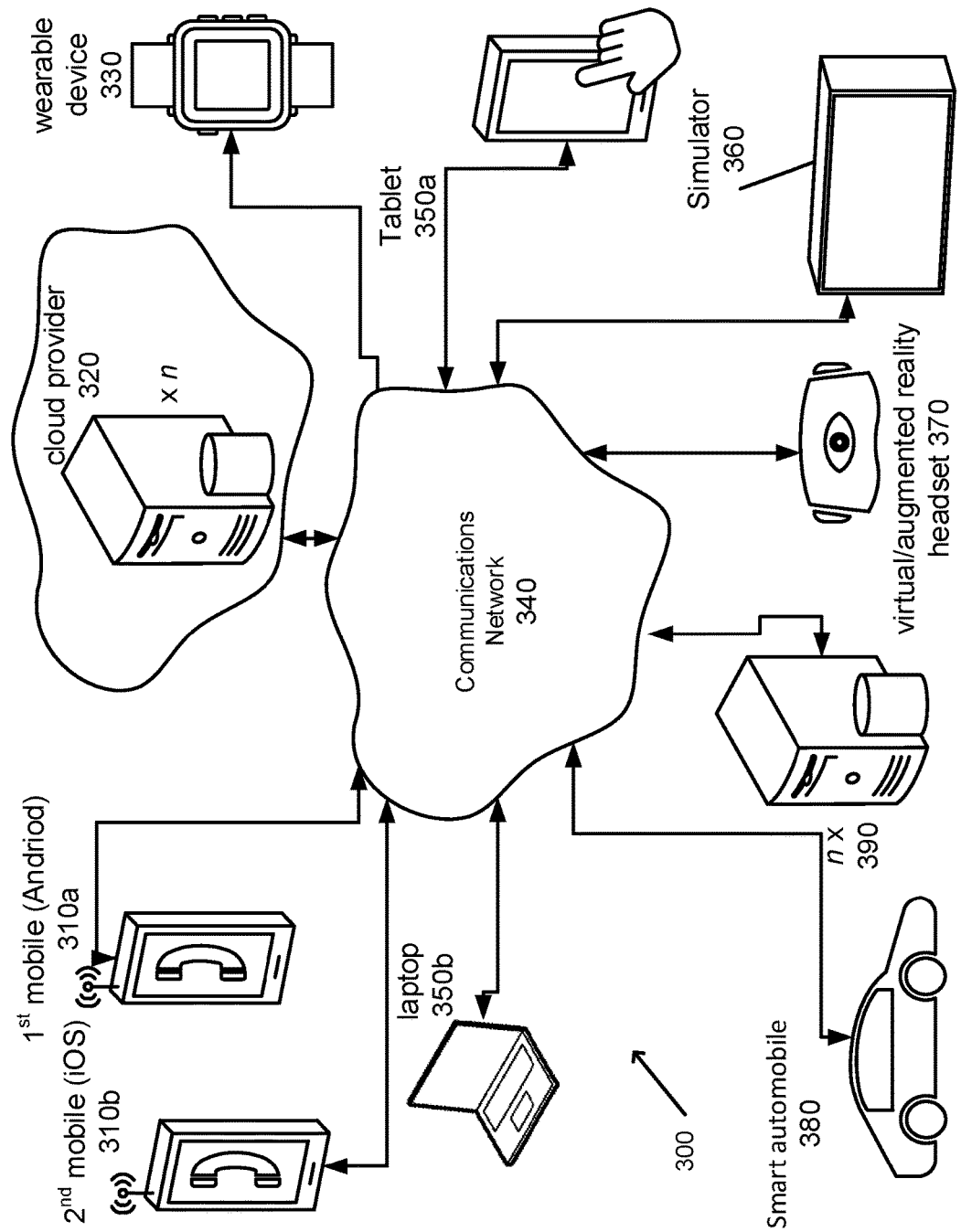
FIG. 4 illustrates a block diagram of a system for managing construction project lifecycle communicating with various computing devices via a communication network, in accordance with an embodiment of the disclosure.

FIG. 4 illustrates an example network environment, in accordance with some embodiments of the present disclosure. A number of electronic systems and devices can communicate with each other in a network environment in accordance with the embodiments discussed herein. The network environment has a communications network 340. The communications network 340 can include one or more networks selected from an optical network, a cellular network, the Internet, a Local Area Network ("LAN"), a Wide Area Network ("WAN"), a satellite network, a fiber network, a cable network, and combinations thereof. In some embodiments, the communications network 340 is the Internet. There may be many server computing systems and many client computing systems connected to each other via the communications network.

The communications network 340 can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 310a (e.g., smartphone with an Android-based operating system), a second mobile computing device 310b (e.g., smartphone with an iOS-based operating system), a cloud provider 320, a wearable electronic device 330 (e.g., a smartwatch), a first portable computer 350a (e.g., laptop computer), a second portable computer 350b (e.g., tablet with an Android- or iOS-based operating system), a simulator 360, a virtual/augmented reality handset 370, and an electric vehicle 380, and the like. The client computing system can include, for example, the software application or the hardware-based system in which may be able exchange communications with the first electric personal transport vehicle, and/or the second electric personal transport vehicle. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer (e.g., the client computing system) and the server computing system can both initiate and respond to communications, their communications can be viewed as peer-to-peer. Additionally, the server computing systems include circuitry and software enabling communication with each other across the network.

Any one or more of the server computing systems can be a cloud provider. A cloud provider 320 can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. Alternatively, a resident application on the device rather than the browser may directly call and communicate with the backend server. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Figure 5:
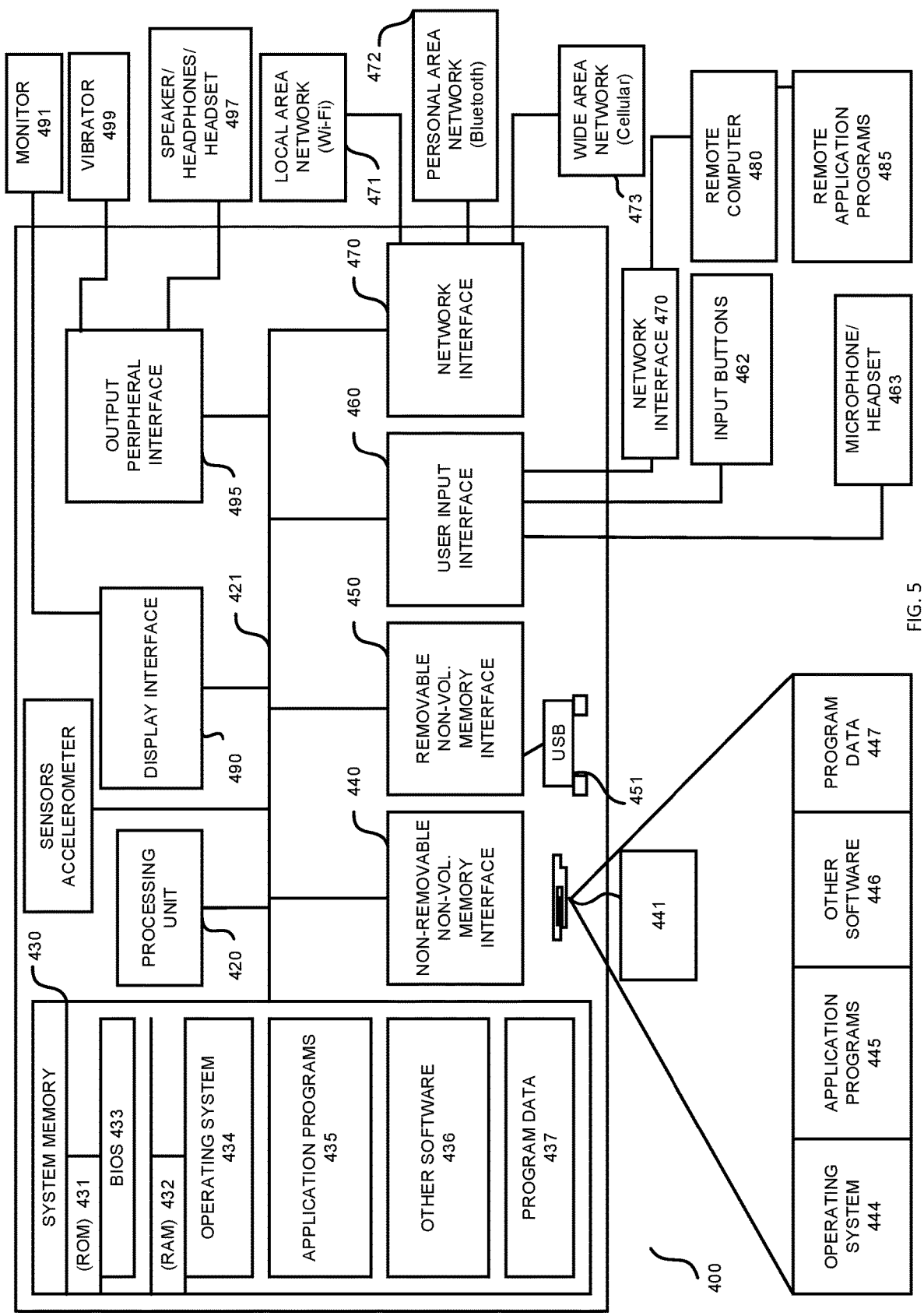
FIG. 5 illustrates a block diagram of a computing device associated with the system for managing construction project lifecycle, in accordance with an embodiment of the disclosure.

FIG. 5 illustrates a block diagram of an embodiment of one or more computing device, in accordance with some embodiments of the present disclosure. The computing device may include one or more processors or processing units 420 to execute instructions, one or more memories 430-432 to store information, one or more data input components 460-463 to receive data input from a user of the computing device 400, one or more modules that include the management module, a network interface communication circuit 470 to establish a communication link to communicate with other computing devices external to the computing device, one or more sensors where an output from the sensors is used for sensing a specific triggering condition and then correspondingly generating one or more preprogrammed actions, a display screen 491 to display at least some of the information stored in the one or more memories 430-432 and other components. Note, portions of this design implemented in software 444, 445, 446 are stored in the one or more memories 430-432 and are executed by the one or more processors 420. The processing unit 420 may have one or more processing cores, which couples to a system bus 421 that couples various system components including the system memory 430. The system bus 421 may be any of several types of bus structures selected from a memory bus, an interconnect fabric, a peripheral bus, and a local bus using any of a variety of bus architectures.

Computing device 402 typically includes a variety of computing machine-readable media. Machine-readable media can be any available media that can be accessed by computing device 402 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 402. Transitory media such as wireless channels are not included in the machine-readable media. Machine-readable media typically embody computer readable instructions, data structures, and other executable software.

In an example, a volatile memory drive 441 is illustrated for storing portions of the operating system 444, application programs 445, other executable software 446, and program data 447.

A user may enter commands and information into the computing device 402 through input devices such as a keyboard, touchscreen, or software or hardware input buttons 462, a microphone 463, a pointing device and/or scrolling input component, such as a mouse, trackball or touch pad 461. The microphone 463 can cooperate with speech recognition software. These and other input devices are often connected to the processing unit 420 through a user input interface 460 that is coupled to the system bus 421, but can be connected by other interface and bus structures, such as a lighting port, game port, or a universal serial bus (USB).

A display monitor 491 or other type of display screen device is also connected to the system bus 421 via an interface, such as a display interface 490. In addition to the monitor 491, computing devices may also include other peripheral output devices such as speakers 497, a vibration device 499, and other output devices, which may be connected through an output peripheral interface 495.

The computing device 402 can operate in a networked environment using logical connections to one or more remote computers/client devices, such as a remote computing system 480. The remote computing system 480 can a personal computer, a mobile computing device, a server, a router, a network PC, a peer device or other common network node, and typically includes many or all of the elements described above relative to the computing device 402. The logical connections can include a personal area network (PAN) 472 (e.g., Bluetooth®), a local area network (LAN) 471 (e.g., Wi-Fi), and a wide area network (WAN) 473 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 402 is connected to the LAN 471 through a network interface 470, which can be, for example, a Bluetooth® or Wi-Fi adapter. When used in a WAN networking environment (e.g., Internet), the computing device 402 typically includes some means for establishing communications over the WAN 473. With respect to mobile telecommunication technologies, for example, a radio interface, which can be internal or external, can be connected to the system bus 421 via the network interface 470, or other appropriate mechanism. In a networked environment, other software depicted relative to the computing device 402, or portions thereof, may be stored in the remote memory storage device. By way of example, and not limitation, remote application programs 485 as reside on remote computing device 480. It will be appreciated that the network connections shown are examples and other means of establishing a communications link between the computing devices that may be used.

It should be noted that the present design can be carried out on a computing device such as that described with respect to FIG. 5. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A system for managing a construction project lifecycle, comprising:
    a surveyor module having an application programming interface (API) configured to connect to and access data associated with feeder conduit installations and feeder wire installations in a construction project;
    where the surveyor module is further configured to display templates to a user, where the templates include at least wire forms, an order history associated with the accessed data, a feed conduit data, a feeder wire data, a termination megger data, and a termination torque data, where the system for managing the construction project lifecycle is configured to update and display the accessed data to the user in real-time,
    where the surveyor module is further configured to use and populate the templates with known information, where the surveyor module is further configured to include a software translation module having algorithms that once the user puts new information into a template and submits the template, the software translation module can collect and store the new information, where a user interface of the template is projected in a form and format that the user in a field uses, one or more processing units configured to execute software instructions associated with the surveyor module; and one or more non-transitory storage mediums configured to store at least software associated with the surveyor module.

2. The system of claim 1, where the accessed data associated with the feeder conduit installations includes at least an originating equipment, a destination equipment, information of an installer, a date of an installation, whether the installation is complete, and a duration of the installation.

3. The system of claim 1, the accessed data associated with the feeder wire installations includes at least an originating equipment, and a destination equipment.

4. The system of claim 1, where the surveyor module is further configured to allow the user to review data associated with terminations megger and terminations torque.

5. A system for managing a construction project lifecycle, comprising:

a surveyor module having an application programming interface (API) configured to connect to and access data associated with feeder conduit installations and feeder wire installations in a construction project from a database in the system for managing the construction project lifecycle;

where the surveyor module is further configured to display templates to a user on a device utilized by the user, where the templates include at least wire forms, an order history associated with the accessed data, a feed conduit data, a feeder wire data, a termination megger data, and a termination torque data, where the database in the system for managing the construction project lifecycle is configured to update the accessed data over a network to the device utilized by the user to be displayed by the device in real-time, where the surveyor module is further configured to call up the templates, where each of the templates include a feeder number, an originating equipment, a destination equipment, a modeled length, a conduit installations date, an amount of conduit installed, a name of an installer, a tax code associated with the installed feeder conduit, a time took for an installation of the feeder conduit, an installation type, a conduit pipe installed, and any parallel runs, one or more processing units configured to execute software instructions associated with the surveyor module; and one or more non-transitory storage mediums configured to store at least software associated with the surveyor module.

6. The system of claim 5, where the templates include macros made out of spreadsheet sheets.

7. The system of claim 1, where the surveyor module is further configured to allow the user to create custom macros to facilitate automate activities with a first template of the templates in connection with other sources of data.

8. The system of claim 1, where the software translation module is further configured to include a Structured Query Language (SQL) conversion module configured to translate programming requests, where the programming requests include queries, relational database tasks, data row requests, and data table reading requests, from one or more non-SQL programming languages into a single format SQL, where the one or more non-SQL programming languages include commands and associated parameters, where the SQL conversion module is configured to extract the new information and put the extracted new information into a first template, where the software translation module is configured to store and organize the extracted new information in a SQL database and, upon receiving a request, access the extracted new information and populate the accessed new information into a corresponding template and display the first template to the user.

9. The system of claim 1, where the surveyor module is further configured to capture one or more pictures of one or more floor plans of a construction site at one or more pre-determined intervals and use artificial intelligence models to at least one of 1) automatically link the one or more pictures, 2) compare pictures captured at different dates, 3) create reports including comparison between the one or more pictures with a building information model, and 4) provide remote access to a project construction site.

10. A method for managing a construction project lifecycle, comprising:

configuring a surveyor module having an application programming interface (API) to connect to and access data associated with feeder conduit installations and feeder wire installations in a construction project;

configuring the surveyor module to display templates to a user, where the templates include at least wire forms, an order history associated with the accessed data, a feed conduit data, a feeder wire data, a termination megger data, and a termination torque data;

configuring the surveyor module to update and display the accessed data to the user in real-time;

configuring the surveyor module to use and populate the templates with known information;

configuring the surveyor module to include a software translation module having algorithms that once the user puts new information into a first template and submits the first template;

configuring the software translation module to collect and store the new information, where a user interface of the first template is projected in a form and format that the user in a field uses, configuring one or more processing units to execute software instructions associated with the surveyor module; and configuring one or more non-transitory storage mediums to store at least software associated with the surveyor module.

11. The method of claim 10, where the accessed data associated with the feeder conduit installations includes at least an originating equipment, a destination equipment, information of an installer, a date of an installation, whether the installation is complete, and a duration of the installation.

12. The method of claim 10, where the accessed data associated with the feeder wire installations includes at least an originating equipment, and a destination equipment.

13. The method of claim 10, further comprising
configuring the surveyor module to allow the user to review data associated with terminations megger and terminations torque.

14. A method for managing a construction project lifecycle, comprising:

configuring a surveyor module having an application programming interface (API) to connect to and access data associated with feeder conduit installations and feeder wire installations in a construction project from a database in the system for managing the construction project lifecycle;

configuring the surveyor module to display templates to a user on a device utilized by the user, where the templates include at least wire forms, an order history associated with the accessed data, a feed conduit data, a feeder wire data, a termination megger data, and a termination torque data;

configuring the surveyor module to update and display the accessed data to the device utilized by the user in real-time;

configuring the surveyor module to call up the templates, where each of the templates include a feeder number, an originating equipment, a destination equipment, a modeled length, a conduit installations date, an amount of conduit installed, a name of an installer, a tax code associated with the installed feeder conduit, a time took for an installation of the feeder conduit, an installation type, a conduit pipe installed, and any parallel runs, configuring one or more processing units to execute software instructions associated with the surveyor module; and configuring one or more non-transitory storage mediums to store at least software associated with the surveyor module.

15. The method of claim 10, further comprising configuring the surveyor module to allow the user to create custom macros to facilitate automate activities with a first template of the templates in connection with other sources of data.

16. The method of claim 10, further comprising configuring the software translation module to include a Structured Query Language (SQL) conversion module to translate programming requests, where the programming requests include queries, relational database tasks, data row requests, and data table reading requests, from one or more non-SQL programming languages into a single format SQL, where the one or more non-SQL programming languages include commands and associated parameters;

configuring the SQL conversion module to extract the new information and put the extracted new information into a first template; and configuring the software translation module to store and organize the extracted new information in a SQL database and, upon receiving a request, access the extracted new information and populate the accessed new information into a corresponding template and display the first template to the user.

17. The method of claim 10, further comprising configuring the surveyor module to capture one or more pictures of one or more floor plans of a construction site at one or more pre-determined intervals and use artificial intelligence models to at least one of 1) automatically link the one or more pictures, 2) compare pictures captured at different dates, 3) create reports including comparison between the one or more pictures with a building information model, and 4) provide remote access to a project construction site.

18. A non-transitory computer readable medium in a system for managing a construction project lifecycle, comprising one or more computer readable codes operable, when executed by one or more processors, to instruct the surveyor module residing on the system for managing a construction project lifecycle to perform the method of claim 10.

* * * * *